Sept. 1, 1931.  C. H. MACKEY ET AL  1,821,227
ROAD SIGN
Filed Jan. 4, 1930    2 Sheets-Sheet 1
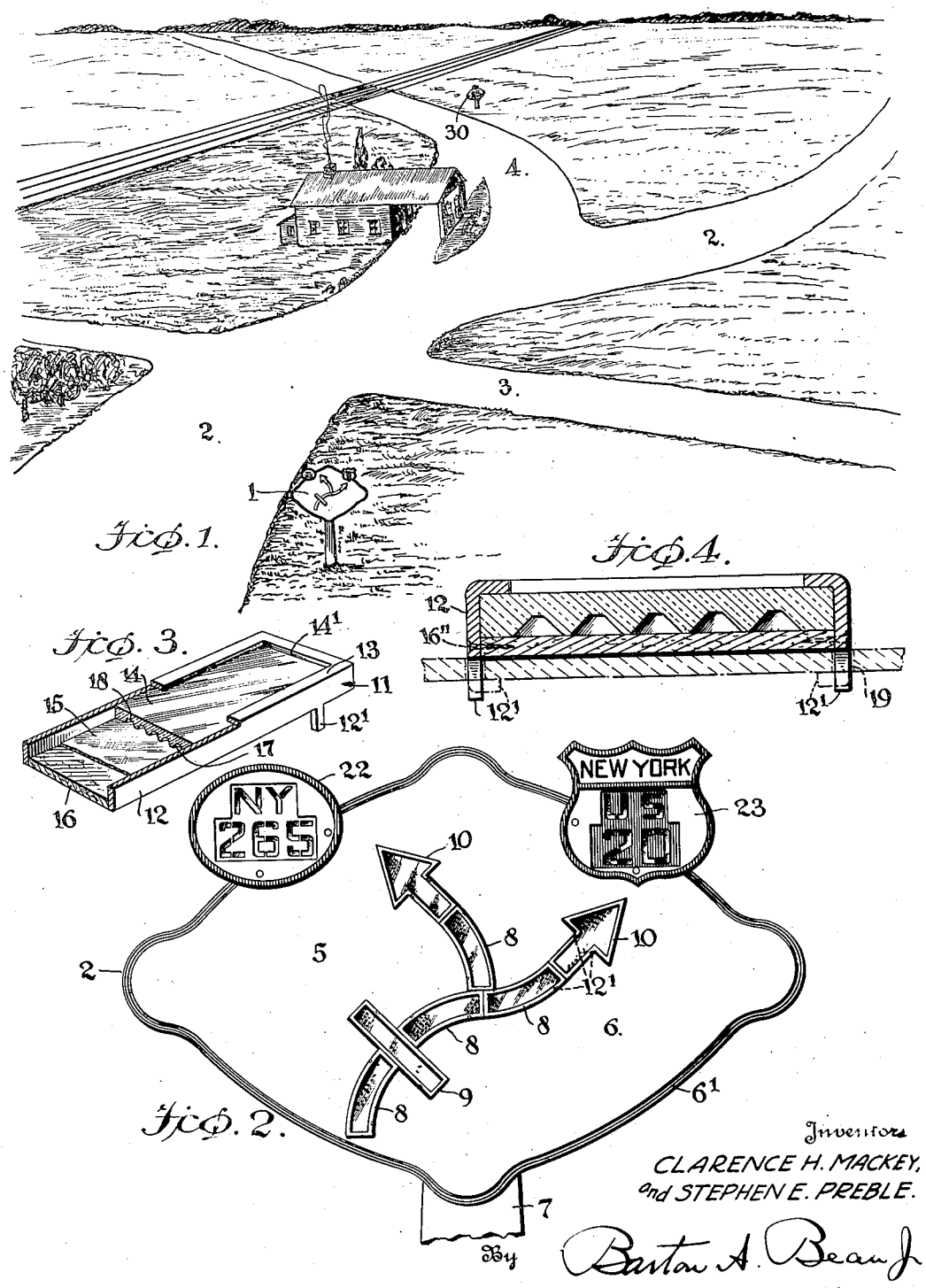
Inventors
CLARENCE H. MACKEY,
and STEPHEN E. PREBLE.
By Barton A. Beau Jr.
Attorney

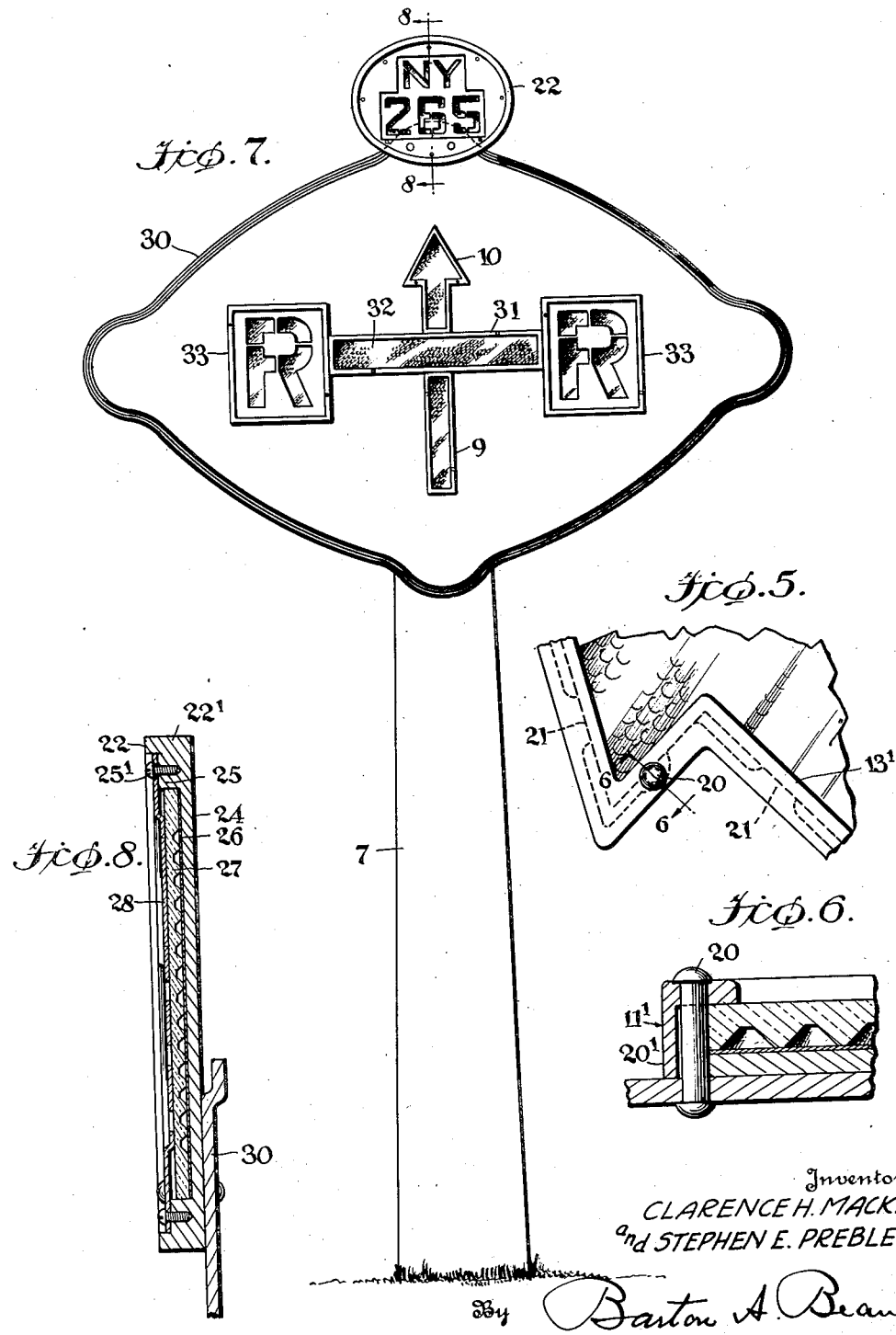

Patented Sept. 1, 1931

1,821,227

UNITED STATES PATENT OFFICE

CLARENCE H. MACKEY, OF LANCASTER, AND STEPHEN E. PREBLE, OF ORCHARD PARK, NEW YORK

ROAD SIGN

Application filed January 4, 1930. Serial No. 418,629.

This invention relates to improvements in road direction indicators and the like and particularly relates to means for improving the visibility and adaptability thereof.

Heretofore road signals have usually been in the form of a sign and have contained conventional route direction matter painted thereon. Most drivers have experienced the difficulty of locating such signs and have experienced greater difficulty in reading such signs en passant, particularly during night driving. Furthermore, each sign must be made up before hand according to the road characteristics to be indicated.

The present invention aims to surmount such difficulties of the driver by providing a road sign of novel construction, which will be readily readable during both day and night driving and which will attract the driver's attention at a distance therefrom and clearly indicate highway directions, route numbers, railroad crossings and the like.

An object of this invention is to provide a sign having readily adjustable or arranged component parts or road direction indicia units, which may be assembled in numerous arrangements on the sign to correspond with and indicate the separate road hazards or conditions in a road system.

Another object of this invention is to provide such indicia with reflection means for reflecting the rays of headlights back to the driver to render the indicia readable at a distance during night driving.

A further object is to provide a novel form of indicia unit, which through simplicity of construction and ease of assembly renders the manufacture thereof possible on a commercial basis.

The invention further resides in the salient features of construction and the arrangement of parts hereinafter set forth, reference being had to the accompanying drawings wherein:

Fig. 1 is a perspective view showing the direction indicators mounted at strategic points in a group of roads.

Fig. 2 is a front elevation of one of the indicators of Fig. 1, more clearly setting forth its construction.

Fig. 3 is a perspective view of an indicia unit of preferred form, showing portions thereof progressively broken away to illustrate the relative arrangement of parts.

Fig. 4 is a cross section through another type of indicia unit.

Fig. 5 is a plan view of an indicia unit provided with a different type of attaching means.

Fig. 6 is a section on the line 6—6 of Fig. 5.

Fig. 7 is a front elevation of a railroad warning sign embodying the present invention.

Fig. 8 is a section on the line 8—8 of Fig. 7.

Referring more in detail to the accompanying drawings, the numeral 1 refers generally to the indicator shown in the foreground of Fig. 1. This indicator is shown mounted adjacent a road 2 and includes a road system symbol, which assembled as shown, indicates the road disposition at the approaching junction. As exemplified in Fig. 1 to portray the adaptability of the indicator, the indicator maps out the approaching cross road 3, the double curve in the road 2, and the fork 4. It will be noted that the indicia units in assembly closely approximate in appearance a portion of a standard route map.

In construction the indicator includes a baseboard 5 which is preferably a metal casting or stamping having a flat face 6 and a marginal portion 6'. The baseboard may be of any convenient contour and is adapted to be mounted upon a standard 7 of any suitable type.

The road system symbol preferably comprises separable members, such as shown in Fig. 2 wherein are shown curve units 8, a straight road unit 9, and arrow units 10. It is obvious that other units of different shape may be provided for different road conditions, the group in Fig. 2 showing merely one layout of its many applications. The straight road unit 9 is shown in the broken view in Fig. 3 as having a frame 11, preferably a casting with a thin surrounding wall portion 12 and an angular marginal edge portion 13 extending inwardly from the top thereof to form a frame-like structure having an opening 14' therein. The wall portion 12 may be provided at its lower end with integral pin-like extensions comprising fasteners 12'. The frame is adapted to receive a reflector body, such as a reflex glass 14 and an underlying separator 15 which is preferably of highly polished reflective material, such as aluminum or tinfoil. In assembling this unit the frame 11 is inverted and the reflex glass 14 and the separator are inserted, whereupon a retainer 16 of plastic wood or like substance is poured within the thus formed recess, the separator preventing the access of the plastic wood to the glass. The retainer upon hardening provides a durable and simple means of maintaining this assembly.

In regard to the reflex glass 14, it is preferred that reflecting glass of the general type shown in Sharp, Patent No. 1,675,431 be used and is preferably of clear or amber glass. As shown in Fig. 3 of this application, the cones 17 of such glass face the separator 15, which being reflective will throw the rays projecting through the flat or non-reflecting portions 18 of the glass, back in the general direction of their origin. It will thus be noted that the separator 15 serves both to shield the glass from the plastic wood or other sealing medium upon assembly and to act as a reflector for a portion of the light received by the glass. In this respect it will be noted that each indicia unit contains a reflective surface bordered by a non-reflective surface which is the frame 11, and that upon assembly of the indicia units the non-reflective surfaces will border each other to form or simulate continuous portions of non-reflective material to contrast with the reflective portions contained therein.

Fig. 4 shows a variation of the above construction of the straight road unit 9 wherein, in place of the separator 15 and retainer 16, contains a backing plate 16' which is preferably of wood and may have a painted reflective surface 15'. This member retains the reflex glass 14 within the frame, and is itself retained in the frame by nails 16" which engage through the wall portion 12 to the said plate 16' to maintain the same.

The construction thus described for the straight road unit 9 is similarly applicable to the remaining units, such as the curve unit 8, the arrow unit 10 or any other unitary portion of a simulated road arrangement, exception being had to the shape or contour of such portions.

In Fig. 2 a plural number of the units described, are shown mounted in a road map simulating arrangement on the face 6 of the baseboard 5. The units are shown with ends or sides abutting to create the effect of continuity and are each fastened to the said baseboard by their included fasteners 12' which project through holes 19 of the baseboard and are riveted, staked or bent over the back wall thereof. A further method of providing fastening means is shown in Fig. 5 wherein a frame 11' is shown of similar construction to the said frame 11. The fastening means in this showing comprise a number of spaced rivets 20 which extend through the edge portion 13' and downwardly through the baseboard. The wall portion 20' is recessed to allow clearance of the rivets thereby and in addition contains pads 21 which act as locators for the glass and separator units.

Route number units 22 and 23 (Fig. 2) are mounted near the edges of the baseboard 5 and are located thereon to cooperate with the arrow units 10 in indicating the official route number of the fork 4 and the continuation of the road 2 respectively. These units are adapted to flash a stencilled route number by the same reflection method for the indicia units heretofore described. The route number unit 22 is provided with a flanged frame 22' (Fig. 8) including a bottom 24 and a number of lugs 25. A reflective plate 26 and a reflector glass 27 are mounted on the bottom 24 between the lugs 25.

A stencil plate 28 is secured on the said lugs by the screws 25', thereby retaining the underlying reflector glass and plate 26 in assembled relation therewith, and also in concealing the said lugs. The stencil plate contains cut-out openings indicating the route number, such openings disclose underlying portions of the reflector glass 27, which portions function in the described manner. The route number unit 23 illustrates a national highway shield containing the stencilled letters "U. S. 20", the State "New York" indicated thereon being cast or stamped on the flange of the frame; otherwise the construction of this unit is similar to the previously described unit 22, it being understood that the form and characters thereon are merely exemplary. It will thus be noted that such construction may be adapted to a route number unit of any shape or contour, the prime objective of the structure of this invention applied to such units, being to clearly blazen forth the route characteristic and number to cooperate with the arrow units in showing the number of the pointed out road.

The railroad warning indicator 30 shown in Fig. 1 is more fully shown in Fig. 7 and utilizes the usual baseboard 5 on which is mounted a symbol made up of a straight road unit 9 and an arrow unit 10. Between these units is interposed a railroad unit 31 the construction of which is similar to the said straight road unit with the exception that the reflex glass 32 therein is of a red color to reflect red rays of light. At each end of this unit or in any other desired position is mounted a stencilled "R" unit 33 similar in construction to the route indicators described. The reflex glass in the units 33 are also preferably of a red color. With this arrangement the presence of a railroad crossing is clearly indicated to the driver as the red reflection clearly stands forth in contrast to the white or amber reflection of the heretofore described units.

It will thus be noted that any road system or condition may be progressively indicated by the indicators of this invention. While Fig. 1 indicates a portion of a road system, it will be understood that such layout is merely an example of the flexibility of the present invention.

The above description particularly depicts one or more simple constructions for the indicia units, which are believed to be practical for economical mass production thereof. It will be further noted that the indicia units, particularly of the type shown in Fig. 5, may be assembled or mounted in the field without undue labor in locating such units, as the holes therein may be used as a drilling jig for locating the rivets of the same. This feature especially adapts itself to road changes, road number changes, and the like, wherein units may be remounted or omitted without removal or destruction of the baseboard.

What is claimed is:

1. A road indicator comprising a baseboard, a plurality of sections assembled on said baseboard in contacting relation to each other to form a continuous road layout, each section having a reflective face bordered by a non-reflective margin to reflect light projected thereto whereby such faces adumbrate the border portions of the assembled sections to both indicate separate road hazards and the road layout as a whole.

2. A road indicator comprising a baseboard; a plurality of thin elongated sections, all of substantially equal width, each section being formed to simulate an individual road condition, each section having parallel sides having non-reflective marginal portions enclosing a reflective face, said reflective face approximating in shape the outline of the section, means for mounting said sections on the baseboard with their ends in abutting relation, said reflective faces on the assembled sections adumbrating the adjacent marginal portions, whereby the marginal portions on the sides of each section cooperate with similar portions of adjacent sections to indicate a continuous road and the marginal portions on the ends of said assembled sections separate the reflective portions of adjacent sections to indicate separate road conditions.

CLARENCE H. MACKEY.
STEPHEN E. PREBLE.